United States Patent [19]

Doering

[11] 3,859,777
[45] Jan. 14, 1975

[54] THATCHING APPARATUS
[75] Inventor: Charles W. Doering, Clarksville, Ind.
[73] Assignee: Brinly-Hardey Co., Inc., Louisville, Ky.
[22] Filed: May 29, 1973
[21] Appl. No.: 364,906

Related U.S. Application Data
[63] Continuation-in-part of Ser. No. 306,353, Nov. 13, 1972, abandoned.

[52] U.S. Cl.................. 56/16.7, 56/364, 56/400
[51] Int. Cl............................................ A01d 77/00
[58] Field of Search ....... 56/16.9, 400, 400.01, 364, 56/16.1, 16.7

[56] References Cited
UNITED STATES PATENTS
2,931,161   4/1960   Johnston............................... 56/400
3,323,196   6/1967   Renn..................................... 56/364
3,512,345   5/1970   Smith.................................... 56/16.9

Primary Examiner—Robert Peshock
Assistant Examiner—J. N. Eskovitz
Attorney, Agent, or Firm—Frank C. Leach, Jr.

[57] ABSTRACT

Thatching apparatus operates in rotary reel fashion with a rotating shaft carrying thatching elements or blades. The shaft rotates very rapidly, whirling the thatching elements so that they deliberately strike the ground, and hence also rocks and other objects lying on the ground. They are thus subject to extreme stresses. A durable thatching finger or blade is provided.

17 Claims, 11 Drawing Figures

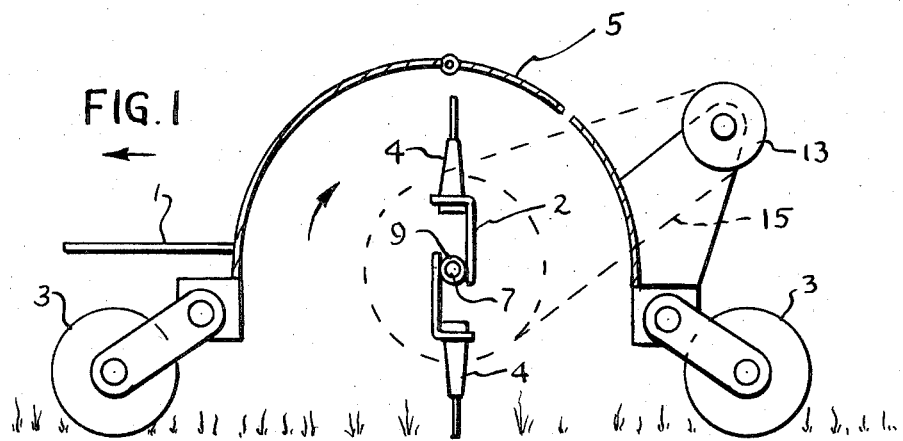
FIG. 1
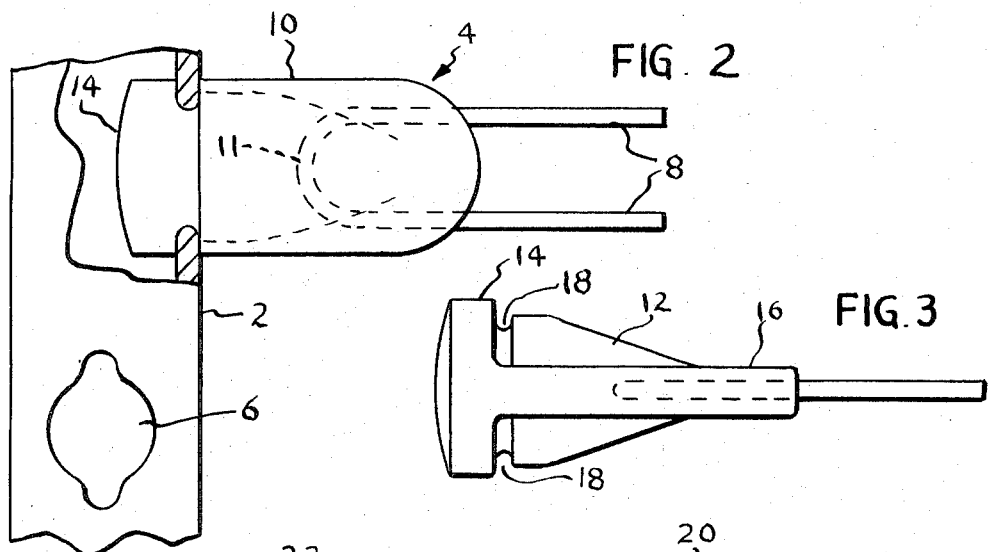
FIG. 2
FIG. 3
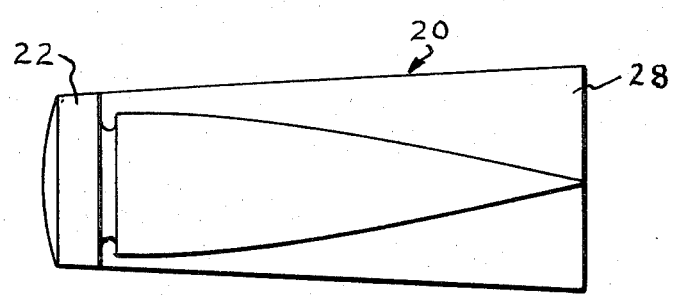
FIG. 4
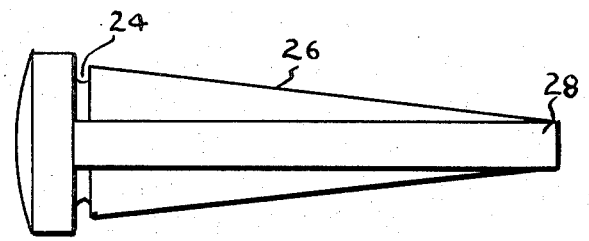
FIG. 5

FIG. 6
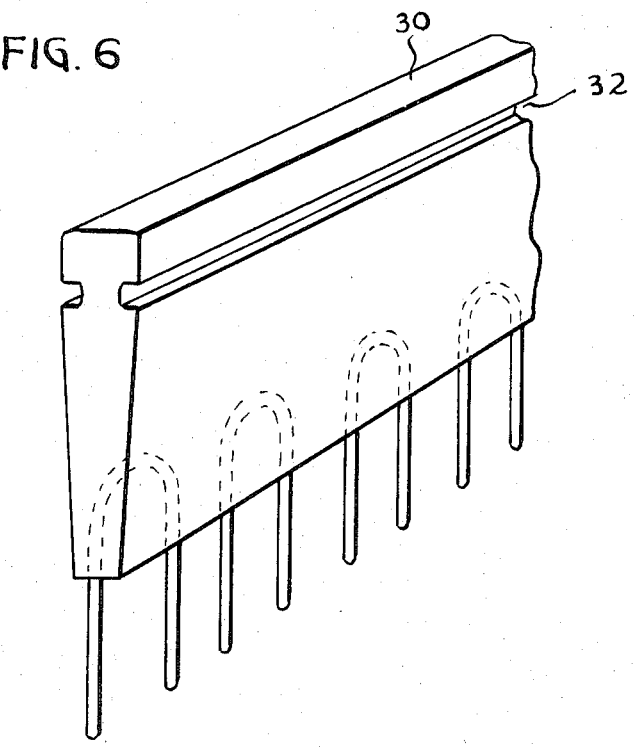
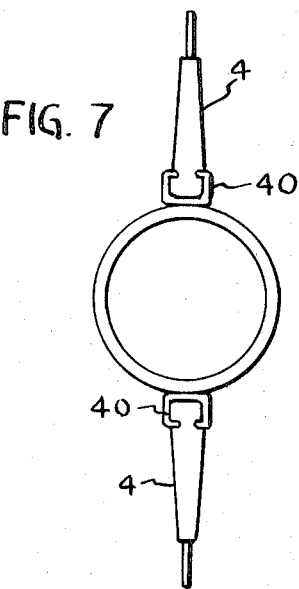
FIG. 7
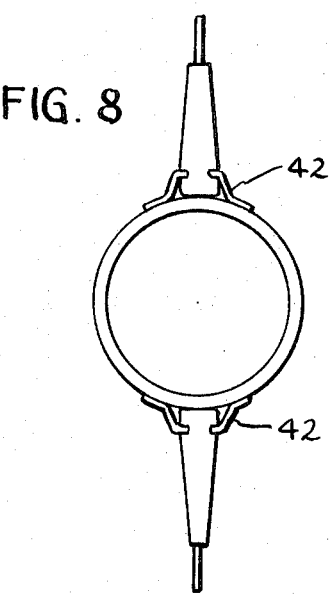
FIG. 8

THATCHING APPARATUS

This is a continuation-in-part of application Ser. No. 306,353, filed Nov. 13, 1972, now abandoned.

Thatchers operate in a manner somewhat similar to the rakes described in such Patents as Nos. 2,931,161, Re. 24,825, 3,019,586, and 3,096,609. However, in rotary reel rakes, the reel turns slowly. In addition, adjustments can be made to keep rake teeth from striking the ground.

In thatching apparatuses of the type contemplated herein, the reel or bar carrying the thatching fingers or blades revolves many times faster than a rake bar. In addition, thatching fingers or blades deliberately strike the ground, and, hence, also rocks and other objects lying in the grass. For this reason, teeth of the type employed in rotary reel rakes have not been used in thatchers.

Fingers attached to thatcher bars have been in the form of fixed or free swinging knife blades or helical or torsion springs. The action of knife blades is quite severe. Helical springs on the other hand are subject to the problems of bending and vibrational fatigue during use.

Recently there has been an increased demand for thatchers which are adapted to pick up the thatch at the same time that it is being loosened. Such apparatus can be provided with a chute and a thatch or debris collector, for example. In apparatus of this type, it is desirable that the thatching fingers or blades have a fanning action to hurl the thatch through the chute to the thatch or debris collector.

The present invention satisfactorily solves the foregoing problems through utilizing a thatching apparatus having fingers or blades mounted on support means, which rotate about a substantially horizontal axis, with an elastomeric mounting member mounting each of the blades on the support means. The blade can have tines integral with the elastomeric mounting member so that the thatching produced by these tines deliberately engaging the ground does not result in the severe tearing action of the ground produced by swiveling knife blades, for example. Similarly, because of the use of the elastomeric mounting member, the thatching blades of the present invention are not subjected to the high bending stresses and vibrations associated with the helical or torsional spring type fingers or blades. As a result, the thatching apparatus of the present invention not only produces a more desired thatching action but also has blades of longer life.

In one embodiment, the present invention contemplates using the blades in a thatching apparatus in which a debris collector is utilized in conjunction therewith to receive the thatched material from the thatcher. In this embodiment, the thatching blades have a broad side for fanning action, which assists in blowing the thatched material toward the collector.

In another embodiment of the present invention, no more than half of the blades may be formed without any tine so as to not perform any thatching action or engage the ground. However, these blades preferably have a broad side of increasing surface towards the end to further aid in the fanning action to assist in blowing the thatched material toward the collector. Thus, this embodiment would be utilized where an increased fanning action is desired.

In a further embodiment of the present invention, the thatching apparatus may be employed with stripper bars or the like in conjunction with a thatch or debris collector for the thatched material. In this embodiment, the thatched material is removed from the tines of the thatcher blades by pushing the material between the stripping bars, which will be disposed between adjacent tines, so that the material is stripped from the tines as the tines rotate between the stripper bars.

An object of this invention is to provide a thatching apparatus having thatching blades with a longer life.

Another object of this invention is to provide a thatching apparatus in which the blades are prevented from permanently deforming during utilization.

Still another object of this invention is to provide a thatching apparatus having an increased fanning action for directing the thatched material to a debris collector or the like.

Other objects of this invention will be readily perceived from the following description, claims, and drawings.

This invention relates to an apparatus including support means for rotation about a substantially horizontal axis with the support means having blades supported thereon in a plurality of rows angularly spaced from each other about the axis of rotation. Each of the blades includes an elastomeric mounting member formed of a material capable of bending and returning to its original shape after bending. The elastomeric mounting member has means cooperating therewith to mount the blade on the support means. At least one half of the blades in each of the rows has at least one tine integral with the elastomeric mounting member for thatching action with each tine in each of the rows being disposed in spaced relation to each other. The elastomeric mounting member has a broad portion in comparison with the width of any of the tines integral therewith, and the broad portion of the elastomeric mounting member extends beyond the support means. The mounting means includes means to insure that the elastomeric mounting member and any of the tines integral therewith return to their original positions after any bending.

The attached drawings illustrate preferred embodiments of the invention, in which:

FIG. 1 is a diagramatic representation, partly in section, of a thatching apparatus using one form of thatching blade of the present invention;

FIG. 2 is a plan view, partly in section, of a portion of the apparatus of FIG. 1 and showing a portion of a support bar with one of the thatching blades or fingers attached thereto;

FIG. 3 is a side elevational view of a thatching blade or finger of the type employed in FIG. 2;

FIG. 4 is a plan view of another form of blade utilized with the thatching apparatus of FIG. 1 to increase the fanning action;

FIG. 5 is a side elevational view of the blade of FIG. 4;

FIG. 6 is a perspective view of another form of thatching blade for use with the thatching apparatus of FIG. 1;

FIG. 7 is an end elevational view showing one arrangement for holding the blade of FIG. 6 on the support means of the thatching apparatus of FIG. 1;

FIG. 8 is an end elevational view showing another arrangement for holding the blade of FIG. 6 on the support means of the thatching apparatus of FIG. 1;

Figure 9:
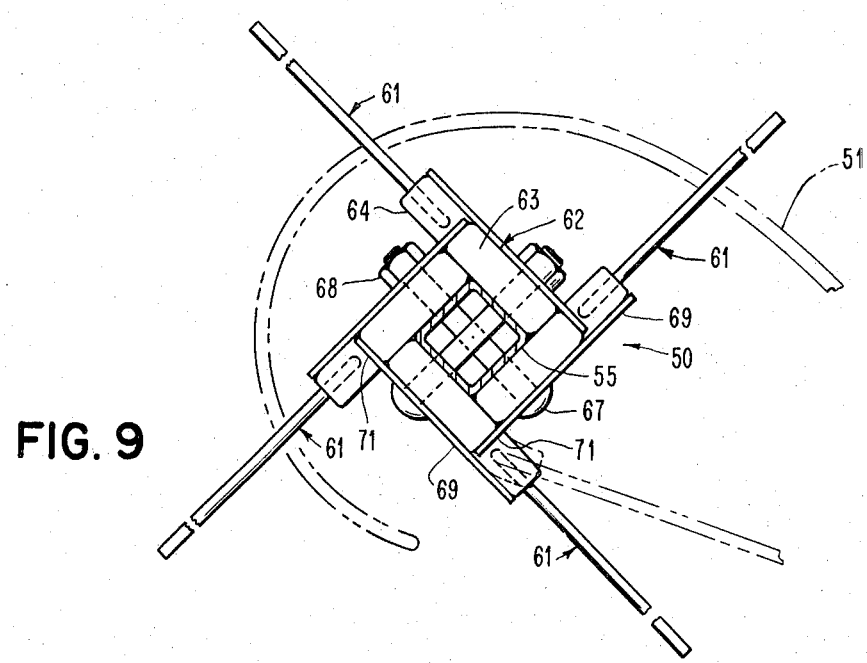
FIG. 9 is an end elevational view, partly in section, of another embodiment of the thatching apparatus of the present invention.

Referring to the drawings and particularly FIG. 1, there is shown one form of thatching apparatus of the present invention. The thatching apparatus includes a housing 5 having a tongue or drawbar 1 extending therefrom for connection to a riding mower or tractor, for example, so that the thatching apparatus may be propelled to the left as viewed in FIG. 1.

The housing 5 has adjustable front and rear rollers or wheels 3 to support the thatching apparatus. A shaft 7, which is rotatably supported in the housing 5, may be a hollow member on which a sleeve 9 is slidably fitted for rotation therewith.

The sleeve 9 has a pair of support bars 2 secured thereto by suitable means such as bolts or welding, for example. Accordingly, the sleeve 9 and the bars 2 form a rotary thatching member, which is slidably fitted on the main shaft 7.

Each of the bars 2 is adapted to receive and hold a plurality of thatching fingers or blades 4. Each of the bars 2 is preferably an L-shaped member with the blades 4 being adapted to be mounted in either or both surfaces thereof. Thus, while FIG. 1 shows each of the bars 2 having only one row of the blades 4 mounted thereon, each of the bars 2 could have two of the rows of the blades 4 mounted thereon with the rows being perpendicular to each other. FIG. 2 shows the blade 4 mounted in the other of the surfaces of the bar 2 from that shown in FIG. 1. Accordingly, the rows of the blades 4 are equally angularly spaced from each other about the axis of rotation of the shaft 7.

It should be understood that openings 6 in one of the surfaces of the support bar 2 are so located with respect to the openings 6 in the other surface of the support bar 2 that the blades 4 in each of the rows of each of the support bars 2 can be aligned with each other in the direction of rotation of the support bars 2 if desired. Of course, it is not necessary for the blades 4 to be aligned with each other in the direction of rotation for the thatching apparatus to function satisfactorily.

The shaft 7 is driven clockwise from a power means 13, which can be a self-propelled motor, for example, through suitable drive means 15. The drive means 15 can include a chain passing around a sprocket, which is secured to the shaft 7, and a sprocket driven from the shaft of the motor of the power means 13. In this manner, the support bars 2 are rapidly rotated to whirl the fingers or blades 4 so that thatching is produced when the fingers or blades 4 deliberately strike the ground.

As shown in FIG. 2, the bar 2 has the orifices or openings 6 formed in each of its surfaces to hold the thatching blades 4 therein in spaced relation to each other in a direction parallel to the direction of the axis of rotation of the shaft 7. Each of the blades 4 includes an elastomeric mounting member 10 which is preferably a synthetic rubber such as neoprene, for example, having a pair of tines 8 formed integral therewith in any suitable manner such as being secured thereto by molding, for example. For added strength, the tines 8 can be joined in U-shaped fashion as indicated at 11.

As shown in FIG. 3, the elastomeric mounting member 10 includes a generally cylindrical enlarged base portion 14 having a ribbed or tapered strengthening portion 12 extending therefrom. The elastomeric mounting member 10 includes a flexible tine-holding portion 16 extending beyond the portion 12 and in which the tines 8 are molded.

To mount the thatching blade 4 on the support bar 2, the thatching blade 4 is inserted through the opening 6 from the back side. That is, the tines 8 are passed through the opening 6 first.

The base portion 14 of the elastomeric mounting member 10 has a groove 18 formed therein for cooperation with the internal and external surfaces of the support bar 2 in which the opening 6 is formed. When the blade 4 is inserted in the opening 6, the tine-holding portion 16 is grasped and pulled to seat the internal and external surfaces of the support bar 2 in the groove 18.

As shown in FIG. 3, the groove 18 is not continuous but is interrupted on each side so that the elastomeric mounting member 10 has portions for disposition in diametrically disposed enlarged portions (see FIG. 2) of the opening 6, which receives the elastomeric mounting member 10, so that the blade 4 cannot turn relative to the support bar 2. Thus, this arrangement insures that the blade 4 returns to its original position after any bending.

The opening 6 can have any shape depending upon the shape of the elastomeric mounting member 10 and the shape of the groove 18 therein. For example, the opening 6 can be square, rectangular, elliptical, or keyholed.

By preventing the blade 4 from turning, the blade 4 is retained in a position so that its wide side, which extends beyond the support bar 2, is substantially wider than the width of any of the tines 8. This confers a fanning action by the blade 4 on the thatched material. This fanning action is particularly important when the thatching apparatus has a debris collector communicating therewith to receive the thatched material.

As shown in FIG. 1, the housing 5 may have a cover pivotably connected thereto by a hinge. Thus, the cover could be pivoted counterclockwise about its hinge, which is shown in FIG. 1 at the top of the housing 5, to enable a bag, a chute, or a hopper, for example, to communicate with the uncovered opening in the housing 5 to collect the thatched material.

To increase the fanning action when the housing 5 has a debris collector communicating therewith through the uncovered opening in the houisng 5 due to pivoting the cover counterclockwise about the hinge, a plurality of the thatching blades 4 in one or more of the rows of blades can be replaced by blades 20. The blade 20 is preferably formed of a suitable elastomeric material such as synthetic rubber, for example.

Since the blade 20 does not engage the ground and does not produce any thatching, at least one half of the blades in each of the rows of the blades on the support blade 2 should be the thatching blades 4 to insure sufficient thatching action. Thus, no more than half of the blades in any of the rows should be the blades 20.

The blade 20 includes an elastomeric mounting member having a substantially cylindrical enlarged base portion 22. The blade 20 has a groove 24 formed therein adjacent the base 22 for cooperation with the internal and external surfaces of the support bar 2 in the same manner as the groove 18 of the blade 4 cooperates with the surfaces of the support bar 2.

The blade 20 has a ribbed or tapered strengthening portion 26 extending from the base 22 to its end or tip 28. Furthermore, as shown in FIG. 4, the blade 20 has an increasing surface area from the base 22 to the tip or end 28.

This increasing surface area of the blade 20 provides an increased fanning action in comparison with that obtainable from the blade 4. Furthermore, the groove 24 cooperates with the opening 6 in the same manner as the groove 18 of the blade 4 so that there is no turning of the blade 20 during rotation of the blades about the substantially horizontal axis of the shaft 7.

This mounting arrangement also insures that the blade 20 returns to its original position if it should ever be subjected to any bending. However, the blade 20 has its length selected so that its tip or end 28 will not deliberately strike the ground although it could engage rocks or other objects in the grass during rotation, but no damage to the blade 20 will occur since it is formed of an elastomeric material.

While each of the blades 4 has been shown as having two of the tines 8 integral therewith, it should be understood that other types of thatching blades could be employed. For example, as shown in FIG. 6, the blade 4 could be formed by a mounting member 30 of an elastomeric material such as synthetic rubber, for example, in the shape of an elongated member having a plurality of U-shaped tines integral therewith. The mounting member 30 provides an enlarged surface area for increased fanning action.

The mounting member 30 has a groove 32 on each side thereof for disposition in a slot, for example, formed in each of the portions of the support bar 2 of the thatching apparatus. While the mounting member 30 could extend for the entire length of the support bar 2 and provide all the tines necessary for one of the rows on the support bar 2, there preferably is a plurality of the mounting members 30 in each of the rows on each of the support bars 2.

It should be understood that the slots in the support bar 2 are so shaped to prevent any turning of the mounting member 30 and also to insure that the mounting member 30 returns to its original position after any bending. By using the mounting members 30, the length of each of the rows has an increased surface area for fanning action.

When the mounting member 30 forms the blade 4, the blade 4 can be mounted by other means than forming slots in the support bars 2. For example, the support bars 2 can be eliminated and the sleeve 9 could merely have channel retaining elements 40 (see FIG. 7), which could be extruded, for example, secured thereto for cooperation with the grooves 32 of the mounting member 30. The elements 40 could be secured to the sleeve 9 by suitable means such as welding, for example.

Instead of using the elements 40 to support the mounting member 30 when it forms the blade 4, the sleeve 9 can have clamp type retaining elements 42 (see FIG. 8) secured thereto. The elements 42 can be secured to the sleeve 9 by suitable means such as welding, for example.

While only two of the elements 40 have been shown secured to the sleeve 9 in FIG. 7 and only two of the elements 42 have been shown secured to the sleeve 9 in FIG. 8, it should be understood that any number of the elements 40 could be secured thereto to support the mounting members 30 when they form the blades 4. For example, four of the elements 40 could be secured to the sleeve 9 or four of the elements 42 could be secured to the sleeve 9 with each of the elements 40 or 42 being preferably equally angularly spaced from the adjacent element 40 or 42.

When the mounting members 30 are supported in the element 40 or 42, the mounting members 30 abut against each other. In this arrangement, it is necessary for a retainer to be disposed at each end of each of the rows of the mounting members 30 to retain them in the element 40 or 42.

While the present invention has described the thatching apparatuses as being connected to a riding mower or a tractor, for example, it should be understood that such is not required for satisfactory utilization of the present invention. For example, the thatching apparatuses could be self-propelled or hand operated.

Referring to FIG. 9, there is shown a pick-up reel 50, which can be used for thatching. The pick-up reel 50 is designed for use with stripper bars (one shown in phantom at 51) in the manner more particularly shown and described in my copending application for "Apparatus For Collecting Debris," Ser. No. 342,166, filed Mar. 16, 1973.

While the apparatus shown in my aforesaid patent application is utilized in a housing with a device for collecting and compressing the debris, it should be understood that such is not necessary for satisfactory operation of the pick-up reel 50 as long as stripper bars are utilized in conjunction with the pick-up reel 50. Thus, the pick-up reel 50 could be employed in the housing 5 of FIG. 1 if desired.

The pick-up reel 50 includes a shaft 55, which is rotatably supported in the manner more particularly shown and described in my aforesaid copending patent application or may be rotatably supported in the housing 5 of the thatching apparatus of FIG. 1. The shaft 55 is preferably a hollow member, for example, having rounded ends for support in bearings (not shown) in the manner more particularly shown and described in my aforesaid patent application or in the walls of the housing 5 of the thatching apparatus of FIG. 1. Most of the length of the square shaped portion of the shaft 55 is preferably twisted so that the shaft 55 is in the form of a helix along most of its length between its rounded ends.

One end of the square shaped portion of the shaft 55 can have a sprocket mounted thereon for cooperation with a chain, which is driven to cause rotation of the shaft 55. When the pick-up reel 50 is employed in the apparatus of my aforesaid patent application, the chain may be driven in the manner more particularly shown and described in my aforesaid patent application. If the pick-up reel 50 is employed with the housing 5 of the thatching apparatus of FIG. 1, the chain can be driven by the power means 13 in a manner similar to that shown and described for the shaft 7 of FIG. 1.

The shaft 55 has a plurality of rows of blades 61 mounted thereon with each of the rows of the blades 61 preferably being equally angularly spaced from each other. Each of the blades 61 includes an elastomeric mounting member 62 (see FIG. 10), which is preferably formed of synthetic rubber, with the elastomeric mounting member 62 including a base 63 and a plurality of spaced portions 64 extending from one side of the base 63 and integral therewith. Each of the extending portions 64 of the base 63 has tines 65, which are preferably joined together in U-shaped fashion, formed integral therewith so that the tines 65 extend away from the base 62.

Figure 10:
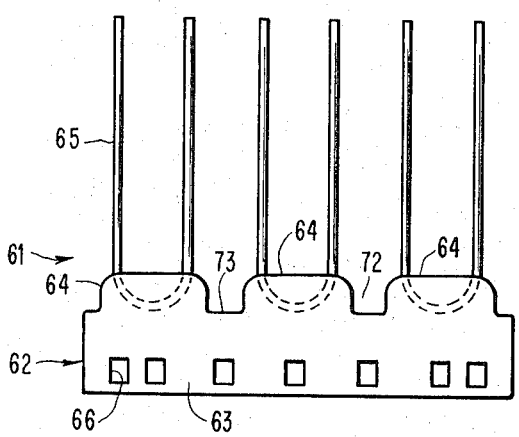
FIG. 10 is a side elevational view of one of the thatching blades of the apparatus of FIG. 9.

As shown in FIG. 10, each of the elastomeric mounting members 62 has three of the extending portions 64 with each of the extending portions having one of the U-shaped tines 65 integral therewith. However, it should be understood that the elastomeric mounting member 62 could only have one of the extending portions 64 and one of the U-shaped tines 65 if desired. The number of the extending portions 64 and the U-shaped tines 65 could also be two or greater than three if desired. However, the configuration of FIG. 10 with three of the extending portions 64 and three of the U-shaped tines 65 is preferred.

Each of the elastomeric mounting members 62 has a plurality of rectangular shaped openings 66 formed in the base 63 to enable bolts 67 (see FIG. 9) to pass therethrough to secure the blade 61 to the shaft 55. As shown in FIG. 9, each of the bolts 67 passes through one of the blades 61 in two of the rows of the blades 61 which are disposed 180° from each other. Each of the bolts 67 has a nut 68 cooperating therewith to connect the blades 61 to the shaft 55.

A retainer 69 is disposed adjacent all of the blades 61 in each of the rows of the blades 61 and extends for the same length as the length of the twisted part of the square shaped portion of the shaft 55. Each of the retainers 69 has square shaped openings 70 (see FIG. 11) formed therein to receive the bolts 67 cooperating with the blades 61 in the row with which the retainer 69 cooperates.

The retainer 69 has a sufficient length to extend as far as all of the blades 61 in a row. Furthermore, as shown in FIG. 9, the height of the retainer 69 is substantially the same as the height of the elastomeric mounting member 62 of the blade 61 so that the retainer 69 engages the entire elastomeric mounting member 62 of each of the blades 61.

The openings 70 in the retainer 69 are of less depth than the openings 66 in the elastomeric mounting member 62. Thus, the retainer 69 can be adjusted vertically relative to the elastomeric mounting member 62 to a slight degree.

The retainer 69 has a plurality of tabs 71 extending from one of its sides. Each of the tabs 71 extends into a space 72 (see FIG. 10) between two of the extending portions 64 of the elastomeric mounting member 62 on the blades 61 which are disposed 90° from the retainer 69, between the space formed between the extending portions on two adjacent of the blades 61, and at the ends of the blades 61 in each row.

The tabs 71 bear against a surface 73 of the base 63 of the elastomeric mounting member 62 to prevent the elastomeric mounting member 62 from being pulled out when the tines 65 engage the ground. Thus, the tabs 71 insure that the elastomeric mounting members 62 are not pulled out of their initial positions after being subjected to bending. Without the tabs 71 or similar holding means, the bending of the elastomeric mounting members 62, which are supported solely by the bolts 67, would result in twisting or stretching of the elastomeric mounting members 62 so that they would not return to their original positions after bending.

Each of the retainers 69 cooperates with the extending portions 64 of the elastomeric mounting members 62 of the blades 61 in one of the rows to prevent any deflection or bending of the elastomeric mounting member 62 in the direction of rotation (This is clockwise in FIG. 9.) of the shaft 55. However, the extending portions 64 of the elastomeric mounting member 62 can deflect or bend in the opposite direction to that of rotation of the drive shaft 55. Thus, whenever any of the tines 65 of any of the blades 61 engages a rock or other hard surface during thatching, there is sufficient deflection to prevent breaking of the tine 65. One of the blades 61 is shown deflected in a phantom position in FIG. 9.

Because the shaft 55 has most of the length of the square shaped portion twisted to form a helix, each of the rows of the blades 61 also is formed as a helix. However, it should be understood that it is not necessary for the rows of the blades 61 to be arranged in a helix since they could be straight rows, for example, if desired.

Figure 11:
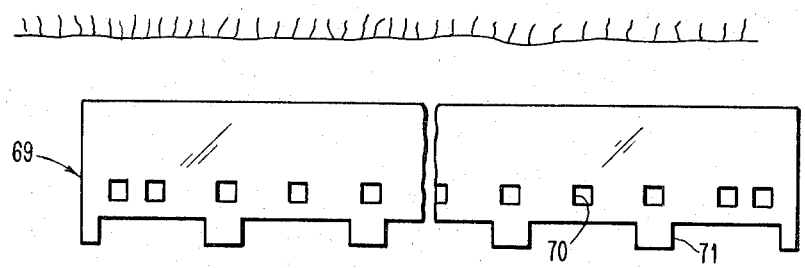
FIG. 11 is a side elevational view of a retainer used in the thatching apparatus of FIG. 9 prior to the retainer being twisted.

While the retainer 69 has been shown as not twisted in FIG. 11 for clarity purposes, it should be understood that the retainer 69 is twisted to have the same helix as the shaft 55 if the shaft 55 is so twisted. Of course, if the shaft 55 is not twisted, then the retainer 69 also would not be twisted.

Since the extending portions 64 of each of the elastomeric mounting members 62 are formed separately from each other, each can deflect or bend separately. Thus, if only one of the tines 65 engages a rock or other object lying in the grass, for example, only the single extending portion 64 having the tine 65 connected thereto would deflect or bend in the direction opposite to that of rotation of the shaft 55.

An advantage of this invention is that an increased fanning action for thatched material can be produced when desired. Another advantage of this invention is that the blades or fingers, which engage the ground for thatching, have a relatively long life in comparison with presently available thatching elements. Still another advantage of this invention is that permanent deformation of the thatching blades is prevented.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:
1. A thatching apparatus including:
support means for rotation about a substantially horizontal axis;
said support means having blades supported thereon in a plurality of rows angularly spaced from each other about the axis of rotation, each of said rows of said blades being equally angularly spaced from each adjacent row of said blades;
said rows of said blades forming an even number of rows;
each of said blades including an elastomeric mounting member formed of a material capable of bending and returning to its original shape after bending;
means cooperating with said elastomeric mounting member to mount said blade on said support means;

each of said blades in each of said rows having at least one tine integral with said elastomeric mounting member for thatching action;

each tine in each of said rows being disposed in spaced relation to each other;

said elastomeric mounting means having a broad portion in comparison with the width of any of said tines integral therewith, said broad portion of said elastomeric mounting member extending beyond said support means;

said mounting means including means to insure that said elastomeric mounting member and any of said tines integral therewith return to their original positions after any bending;

said support means including a single support member;

and said mounting means including separate means to secure each pair of said rows of said blades that are disposed 180° from each other to said support member.

2. The thatching apparatus according to claim 1 in which:

each of said elastomeric mounting members includes a base and a plurality of portions extending from said base;

said extending portions of each of said elastomeric mounting members being spaced from each other in a direction substantially parallel to the axis of rotation of said support member;

each of said extending portions having at least one of said tines formed integral therewith;

and said separate means of said mounting means cooperating with said base of said elastomeric mounting member to secure said blade to said support member.

3. The thatching apparatus according to claim 2 including means to prevent said elastomeric mounting member from bending in the direction of rotation of said support member.

4. The thatching apparatus according to claim 3 in which:

said preventing means includes a plurality of separate retainers equal to the number of said rows of said blades;

each of said retainers being secured to said support member by said mounting means;

and each of said retainers extending for at least the length of said elastomeric mounting members in any of said rows of said blades.

5. The thatching apparatus according to claim 4 in which said insuring means includes means on each of said retainers for disposition between adjacent extending portions of said elastomeric mounting members.

6. A thatching apparatus including:

support means for rotation about a substantially horizontal axis;

said support means having blades supported thereon in a plurality of rows angularly spaced from each other about the axis of rotation;

each of said blades including an elastomeric mounting member formed of a material capable of bending and returning to its original shape after bending;

means cooperating with said elastomeric mounting member to mount said blade on said support means;

each of said blades in each of said rows having at least one tine integral with said elastomeric mounting member for thatching action;

each tine in each of said rows being disposed in spaced relation to each other;

said elastomeric mounting member having a broad portion in comparison with the width of any of said tines integral therewith, said broad portion of said elastomeric mounting member extending beyond said support means;

each of said elastomeric mounting members including a base and a plurality of portions extending from said base;

said extending portions of each of said elastomeric mounting members being spaced from each other in a direction substantially parallel to the axis of rotation of said support means;

each of said extending portions having at least one of said tines formed integral therewith;

said mounting means including means to insure that said elastomeric mounting member and any of said tines integral therewith return to their original positions after any bending;

said mounting means cooperating with said base of said elastomeric mounting member to secure said blade to said support means;

and means to prevent said elastomeric mounting member from bending in the direction of rotation of said support means.

7. The thatching apparatus according to claim 6 in which:

said preventing means includes a plurality of separate retainers equal to the number of said rows of said blades;

each of said retainers being secured to said support means by said mounting means;

and each of said retainers extending for at least the length of said elastomeric mounting members in any of said rows of said blades.

8. The thatching apparatus according to claim 7 in which said insuring means includes means on each of said retainers for disposition between adjacent extending portions of said elastomeric mounting members.

9. A thatching apparatus including:

support means for rotation about a substantially horizontal axis;

said support means having blades supported thereon in a plurality of rows angularly spaced from each other about the axis of rotation;

each of said blades including an elastomeric mounting member formed of a material capable of bending and returning to its original shape after bending;

means cooperating with said elastomeric mounting member to mount said blade on said support means;

at least one half of said blades in each of said rows having at least one tine integral with said elastomeric mounting member for thatching action;

each tine in each of said rows being disposed in spaced relation to each other;

said elastomeric mounting member having a broad portion in comparison with the width of any of said tines integral therewith, said broad portion of said elastomeric mounting member extending beyond said support means;

each of said elastomeric mounting members having an enlarged base end;

said mounting means including means to insure that said elastomeric mounting member and any of said tines integral therewith return to their original positions after any bending;

said mounting means including:
- a groove formed in said enlarged base end;
- and receiving means in said support means in which said enlarged base end of each of said blades is disposed;
- each of said groove and said receiving means being shaped for cooperation with each other to prevent turning of said blade within said receiving means relative to said support means;
- and each of said blades with at least one of said tines integral with said elastomeric mounting member having a portion of said elastomeric mounting member between said support means and said tine forming a broad side for fanning action.

10. The thatching apparatus according to claim 9 in which:
- no greater than one half of said blades in each of said rows has said elastomeric mounting member increasing in surface area from said support means to its end to increase the fanning action;
- and each of said blades having the increasing surface area having no tine integral therewith and being ineffective for thatching action.

11. The thatching apparatus according to claim 10 in which one of said blades with at least one of said tines integral with said elastomeric mounting member is adjacent each side of each of said blades having an increasing surface area.

12. The thatching apparatus according to claim 11 in which each of said rows of said blades is equally angularly spaced from each adjacent row of said blades.

13. The thatching apparatus according to claim 10 in which each of said rows of said blades is equally angularly spaced from each adjacent row of said blades.

14. The thatching apparatus according to claim 9 in which each of said blades in each of said rows has at least one tine integral with said elastomeric mounting member for thatching action.

15. The thatching apparatus according to claim 14 in which:
- said receiving means includes a channel for each of said rows of said blades;
- and said elastomeric mounting member has a pair of said grooves formed therein for cooperation with said channel.

16. The thatching apparatus according to claim 9 in which each of said rows of said blades is equally angularly spaced from each adjacent row of said blades.

17. The thatching apparatus according to claim 9 in which:
- said support means comprises a plurality of support bars;
- said receiving means comprises a plurality of openings formed in each of said bars;
- and said elastomeric mounting member of each of said blades has said groove formed therein for cooperation with one of said openings, said groove engaging the internal and external surfaces of said bar having said opening.

* * * * *